US011409831B1

(12) United States Patent
Vines et al.

(10) Patent No.: US 11,409,831 B1
(45) Date of Patent: Aug. 9, 2022

(54) SYSTEM FOR DETERMINING CACHED LOG DATA ASSOCIATED WITH CACHED RESPONSE DATA

(71) Applicant: AMAZON TECHNOLOGIES, INC., Seattle, WA (US)

(72) Inventors: Forrest Mackenzie Vines, Bonney Lake, WA (US); Ellison Kyle Sudario Bayan, Seattle, WA (US); Amey Shreekant Jahagirdar, Pune (IN); Gianpierre Villagomez Saldana, Seattle, WA (US); Platon Aleksandrovich Chubotin, Seattle, WA (US); Jui Te Tseng, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 331 days.

(21) Appl. No.: 16/587,840

(22) Filed: Sep. 30, 2019

(51) Int. Cl.
*G06F 16/00* (2019.01)
*G06F 16/957* (2019.01)
*G06F 16/17* (2019.01)
*H04L 67/50* (2022.01)
*G06F 16/14* (2019.01)
*G06F 16/16* (2019.01)

(52) U.S. Cl.
CPC ........ *G06F 16/9574* (2019.01); *G06F 16/148* (2019.01); *G06F 16/164* (2019.01); *G06F 16/1734* (2019.01); *H04L 67/22* (2013.01)

(58) Field of Classification Search
CPC ............... G06F 16/9574; G06F 16/953; G06F 16/24522; G06F 16/285; G06F 16/313; G06F 40/169; G06F 40/30; G06F 9/544; G06F 11/2048; G06F 11/2097; G06F 16/00; G06F 16/2358; G06F 16/95; G06F 2201/80; G06F 40/20; G06F 11/0709; G06F 11/0751; G06F 11/0769; G06F 11/079; G06F 11/3006; G06F 11/3072; G06F 11/321; G06F 11/327; G06F 11/3433; G06F 11/3452; G06F 11/3476; G06F 12/0813; G06F 12/0871; G06F 16/10; G06F 16/957; G06F 17/18; G06F 2212/62; G06F 40/194; G06F 40/237
See application file for complete search history.

(56) References Cited

U.S. PATENT DOCUMENTS

| 10,303,533 B1 * | 5/2019 | Panov ................. G06F 11/3452 |
| 2011/0184936 A1 * | 7/2011 | Lymberopoulos ......................... G06F 16/9574 707/721 |
| 2014/0181136 A1 * | 6/2014 | Johnson ............... G06F 16/285 707/768 |

* cited by examiner

*Primary Examiner* — Yicun Wu
(74) *Attorney, Agent, or Firm* — Lindauer Law, PLLC

(57) ABSTRACT

Logs representative of interactions by users or services with interfaces, such as clickstream logs, are generated by combining logs associated with cached data with logs associated with data generated in response to a request. When a first response to a request is generated and a portion of the response data is cached, a first log representative of interactions with the cached data is stored in association with a log identifier. When a second request is received at a subsequent time and the cached data is used to generate a second response, a second log representative of interactions with the response data will include the log identifier for the first log. In response to the log identifier, the first log is accessed and combined with the second log to form a third log representative of interactions with both the cached data and response data for the second response.

20 Claims, 6 Drawing Sheets

SYSTEM FOR DETERMINING CACHED LOG DATA ASSOCIATED WITH CACHED RESPONSE DATA

BACKGROUND

Data indicative of the manner in which a user interacts with a website or other types of user interfaces, such as clickstream data, may be useful for designing user interfaces in a manner that optimizes user experiences, incentivizes purchases or other user interactions, and so forth. However, in some cases, a response provided to a user device may use data that was previously stored in a cache, rather than generating the data for inclusion in the response. In such a case, because the data retrieved from the cache was not generated to prepare the response, a clickstream log for the response may not include information regarding the data from the cache.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
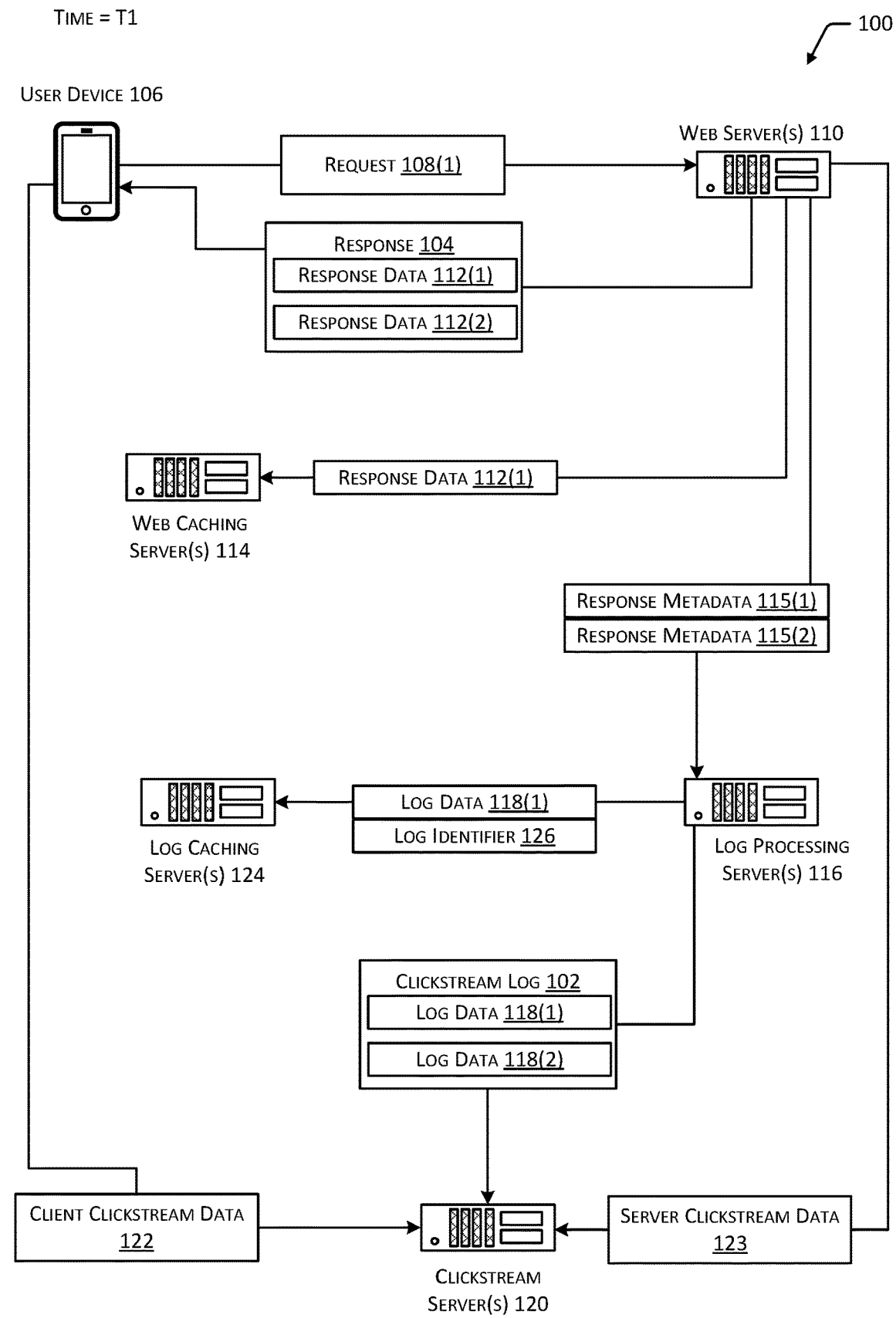
FIG. 1A depicts an implementation of a system that may generate clickstream logs based in part on previously-stored (e.g., cached) data at a first time, when data associated with a response is stored.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Data indicative of the manner in which a user, a service, or another human or automated entity interacts with a website, such as clickstream data, may include information regarding the webpages or other user interfaces that were presented, as well as the components of those webpages. Information regarding interactions with various user interfaces and components may be used to design user interfaces, incentivize purchases, incentivize other types of interactions, and so forth. Typically, when a request to access a webpage or other type of user interface is received by a server or another type of computing device, a response is generated that includes data indicative of the webpage, components, or other information included in the response. When the response is generated, a clickstream log may also be generated that indicates the response data that was provided from the server to the requesting device. In some cases, a portion of the response data may be stored for future use, such as in a cache. For example, a content delivery network (CDN) or browser cache may store a webpage or particular components of a user interface, such as an image. When a subsequent request to access the same or similar content is received, rather than receiving the stored data from the server, data may be retrieved from the cache and used to generate a response. In some cases, the subsequent request must be associated with the same session or session identifier as the previous request and must be received within a selected length of time of the previous request for the cached data to be used to generate the response. In such a case, a clickstream log that is generated may indicate the portion of the response data that is received from the server, but may not indicate use of the data from the cache. As a result, clickstream logs may be incomplete when data from a cache is used to generate a response.

Described in this disclosure are techniques for generating complete clickstream logs representative of interactions with interfaces and data provided in response to the interactions, in cases where previously-stored data, such as data from a cache, is included in a response. When a first request is received from a device, a response may be generated based on the request. The first request may be received at a first time and associated with a first session. For example, the first request may be associated with a first request identifier and a first session identifier. Continuing the example, a request to access a webpage may be received from a device associated with a user account. The response may include personalized data associated with the user account, such as webpage elements that include a user name, item recommendations based on a user's browsing history, and other types of personalized content. The response may also include other data, such as headers, logos, search interfaces, text, images, and so forth. A clickstream log may be generated that indicates the data that was used to generate the response. The clickstream log may be used by consumers of such data to generate user interfaces that may optimize user experiences or incentivize certain types of user interactions, such as purchases of items or navigational selections.

In some cases, a portion of the response data may be stored for future use, such as in a cache. For example, a CDN or a browser cache may store webpages or components of webpages. Continuing the example, portions of a response that are not personalized to a particular user, device, or account may be stored in a cache associated with a CDN for reuse when similar requests are received. When a subsequent request is received and a response that includes the cached data is generated, the stored data from the cache may be used rather than providing the data from a web server to the requesting device. The subsequent request may be associated with a different session. For example, the subsequent request may be associated with a different session identifier, a different request identifier, and in some cases may be received from a different device, user, or account. Use of previously-stored data in this manner may reduce the time and computational resources used to generate and transmit a response. However, when previously-stored data is used in a response, the clickstream log associated with the response may not indicate the previously-stored data and may therefore provide incomplete information. To facilitate generation of a complete clickstream log, when response data is stored in a cache or other type of data storage, a first log that indicates the response data stored in the cache may be generated and stored. The first log may be associated with a unique log identifier. In some implementations, if the stored response data includes a webpage (e.g., page-level data), the log identifier may match the request identifier for the request associated with the response data. In other implementations, if the stored response data includes a component of a user interface (e.g., component-level data), the log identifier may differ from the request identifier and the identifiers for logs of other components. The log identifier may be separate and independent of the session identifier associated with the request associated with the response data. For example, the stored first log may be used independent of the session with which a subsequent request is associated. The first log may be stored with an expiration time greater than or equal to the expiration time associated with the cached response data. For example, after the cached response data expires and is no longer available to be used in a response, the first log may also expire.

When a subsequent request is received and the stored response data is used to generate a response, a second log for the response may be received. The second log may represent the response data that is provided from the server to generate the response, but may not represent the response data that was retrieved from the cache. However, when a request that references the cached data is received or when a response that includes the cached data is generated, the second log may be associated with the log identifier for the first log. As a result, when the second log is received, the first log associated with the included log identifier may be accessed. The first log and second log may be combined to form a third log, which may be a complete clickstream log representing all of the data that was provided in the response, including the previously-stored data.

In some implementations, the first log may be stored temporarily, with a short expiration time, until it has been confirmed that the associated response data has been stored. After receiving an indication that the response data has been stored or determining storage of the response data directly, such as by accessing a cache or other data storage that stores the response data, the expiration time associated with the first log may be increased, or the first log may be moved to data storage associated with a greater expiration time. If no such indication is received before occurrence of the expiration time, the first log may be expired. In other implementations, the first log may include an indication that the associated response data is to be stored. In response to the indication, the first log may be stored without a confirmation that the associated response data was stored. In some cases, receipt of a second log that includes the log identifier for the first log may function as a confirmation that the response data was stored, and the expiration time for the first log may be increased in response to receipt of the log identifier. In cases where a second log that includes the log identifier of the first log is received before the first log has been stored a failure to access the first log may occur. In such a case, the second log may be placed in a queue associated with a count of retries or expiration time, and periodic attempts to access the first log may be undertaken in response to the queued second log.

As one skilled in the art will appreciate in light of this disclosure, certain embodiments may be capable of achieving certain advantages. For example, storing clickstream logs for cached response data may enable complete clickstream logs to be generated when a future response utilizes data from a cache. In the absence of this data, consumers of clickstream logs would acquire incomplete information. An incomplete or partial clickstream log may be of significantly less utility to consumers of clickstream data. For example, an incomplete clickstream log may indicate false correlations between presented data and interactions by a user or service or may fail to enable other correlations to be recognized, resulting in the use of inefficient or ineffective user interface elements. Additionally, using stored clickstream logs, such as by storing the logs in a cache, may enable this data to be provided quickly, using fewer computational resources when compared to generating new clickstream data. Additionally, some implementations may enable clickstream logs to be stored speculatively until confirmation that response data has been cached is received, allowing potentially useful data to be retained while minimizing the data storage and other computation resources that are consumed in cases where the data is not used. Further, the association of stored partial clickstream logs with log identifiers that are separate and independent of the session with which a request or response is associated may enable clickstream logs for cached data to be used independent of the session associated with a subsequent request.

FIG. 1A depicts an implementation of a system 100 that may generate clickstream logs 102 based in part on previously-stored (e.g., cached) data, at a first time T1, when data associated with a response 104 is stored. A user device 106 may provide a request 108(1) to access a webpage, another type of user interface, or other content to one or more web servers 110. The user device 106 may include any type of computing device including, without limitation, a portable computing device such as a laptop computing device, a tablet computing device, a smartphone, or a wearable computing device, a desktop computing device, an automotive computing device, a set top box, a server, and so forth. Additionally, while FIG. 1A depicts a single user device 106, multiple computing devices may generate requests 108(1) and provide requests 108(1) to the web server(s) 110. For example, one or more servers may execute services that provide requests 108(1) to the web server(s) 110. The web server(s) 110 may include any number and any type of computing devices, including, without limitation, the types of computing devices described with regard to the user device 106. Additionally, while FIG. 1A uses the term "web server(s)", the web server(s) 110 may be used to generate responses 104 associated with any type of content related to or unrelated to webpages and websites. The request 108(1) may include data indicative of the user device 106, an associated user account, a service executing on the user device 106, and so forth. In some cases, the request 108(1) may also be associated with one or more identifiers, such as a request identifier, a session identifier associated with a set of interactions between the user device 106 and a website associated with the web server(s) 110, and so forth. In some implementations, the web server(s) 110 may generate or associate one or more of a request identifier or session identifier with the request 108(1).

The web server(s) 110 may receive and process the request 108(1), determine data that corresponds to the request 108(1), and generate a response 104 using the determined data. For example, a request 108(1) to access a webpage may include a uniform resource locator (URL) or other identifier indicative of the webpage, information regarding the user device 106 or a user account, and so forth. Data used to generate the response 104 may include HTML or XML code, script elements, image data, alphanumeric data, audio data, video data, and so forth that is associated with the identifier(s) presented in the request 108(1). In some cases, data used to generate the response 104 may include personalized data, such as data specific to a user account, user device 106, service, and so forth. For example, the response 104 may include data based on a location, browsing history, purchase history, or other characteristics of a user account or user device 106. Data used to generate the response 104 may also include non-personalized data, such as images, text, and so forth that is descriptive of the topic of the requested webpage. The response 104 may include any number of different types of data. For example, FIG. 1A depicts the response 104 including first response data 112(1) and second response data 112(2).

In some cases, at least a portion of the data used to generate the response 104 may be stored in data storage, such as a cache associated with a CDN or with the user device 106, for future use. For example, a webpage may be stored such that if a request 108(1) to access the webpage is received at a subsequent time, the webpage may be retrieved from data storage and provided to the user device 106, or another requesting device, without requiring the web server(s) 110 to generate the portion of the response 104 associated with the webpage. As another example, one or more components of a user interface, such as an image, may be stored, and if a request 108(1) to access the same user interface or a different user interface that also includes the image is received, the image may be retrieved from data storage and provided to the user interface 106 without requiring the web server(s) 110 to generate the portion of the response 104 associated with the image. Continuing the example, FIG. 1A depicts the first response data 112(1) being provided to one or more web caching servers 114. The web caching server(s) 114 may include any number and any type of computing devices, including, without limitation, the types of computing devices described with regard to the user device 106 and web server(s) 110. Additionally, while FIG. 1A uses the term "web caching server(s)", the web caching server(s) 114 may be associated with any type of data storage including but not limited to a cache and may store any type of content related to or unrelated to webpages and websites.

While FIG. 1A depicts the web server(s) 110 providing the first response data 112(1) to the web caching server(s) 114, in other implementations, the user device 106 may provide the first response data 112(1) to the web caching server(s) 114. Additionally, in other implementations, data storage associated with the user device 106, such as a browser cache, may be used, or a cache or other type of data storage associated with the web server(s) 110 may be used, and the web caching server(s) 114 may be omitted. For example, the web server(s) 110 may execute one or more services or include systems associated with the caching of data and the retrieval of cached data.

Response metadata 115 indicative of the response data 112 that was generated may also be provided to one or more log processing servers 116. For example, FIG. 1A depicts first response metadata 115(1) indicative of the first response data 112(1) and second response metadata 115(2) indicative of the second response data 112(2). In some implementations, the web server(s) 110 may also provide data indicative of the request 108(1) or the user device 106 to the log processing server(s) 116, such as a request identifier. The log processing server(s) 116 may include any number and any type of computing devices, including, without limitation, the types of computing devices described with regard to the user device 106 and web server(s) 110. Additionally, in other implementations, the functions described with regard to the log processing server(s) 116 may be performed by the web server(s) 110 and the log processing server(s) 116 may be omitted. The log processing server(s) 116 may generate a clickstream log 102 based on the response metadata 115(1). For example, the clickstream log 102 may include first log data 118(1) generated based on the first response metadata 115(1) and indicative of the first response data 112(1), and second log data 118(2) generated based on the second response metadata 115(2) and indicative of the second response data 112(2). The clickstream log 102 may indicate the data provided to the user device 106, interactions with various components of user interfaces, and so forth. While FIG. 1A depicts the web server(s) 110 providing data indicative of the response 104 to the log processing server(s) 116, in other implementations, such data may be provided by the user device 106. Additionally, in some implementations, the user device 106 may generate at least a portion of the log data 118.

The log processing server(s) 116 may provide the clickstream log 102 to one or more clickstream servers 120. The clickstream server(s) 120 may include any number and any type of computing devices, including, without limitation, the types of computing devices described with regard to the user device 106 and web server(s) 110. Additionally, in other implementations, the functions described with regard to the clickstream server(s) 120 may be performed by one or more of the log processing server(s) 116 or the web server(s) 110, and the clickstream server(s) 120 may be omitted. The clickstream server(s) 120 may receive and process clickstream logs 102 and in some implementations, may receive and process client clickstream data 122 from browser applications or other components of user devices 106. For example, the clickstream server(s) 120 may join a clickstream log 102 with corresponding client clickstream data 122 representative of interactions during a session and store this clickstream data, provide the clickstream data to consumers, and so forth. In some implementations, the web server(s) 110 may generate and provide server clickstream data 123 to the clickstream server(s) 120, which may also be joined with the clickstream log 102 and provided to data consumers.

As described previously, in cases where response data 112(1) is stored in a cache or other type of data storage, a subsequent response 104 may be generated at least in part using the stored response data 112(1). In such a case, the response data 112 provided from the web server(s) 110 to the user device 106 would not include the stored response data 112(1). Therefore, the log processing server(s) 116 may not generate log data 118(1) representative of the stored response data 112(1), even though the stored response data 112(1) was provided to the user device 106 from a cache or other data storage.

To account for such a situation, in response to the storage of the first response data 112(1), the log processing server(s) 116 may provide the first log data 118(1) representative of the first response data 112(1) to one or more log caching servers 124. In other implementations, the web server(s) 110, web caching server(s) 114, or user device 106 may provide the first log data 118(1), data indicative of the first log data 118(1), or data indicative of the first response data 112(1) to the log caching server(s) 124. The log caching server(s) 124 may include any number and any type of computing devices, including, without limitation, the types of computing devices described with regard to the user device 106 and web server(s) 110. Additionally, in other implementations, the functions described with regard to the log caching server(s) 124 may be performed by one or more of the log processing server(s) 116, the web server(s) 110, or the web caching server(s) 114, and the log caching server(s) 124 may be omitted. The log caching server(s) 124 may receive the first log data 118(1) and store the first log data 118(1) in association with a log identifier 126. In some implementations, the log caching server(s) 124 may generate the log identifier 126. In other implementations, the web server(s) 110 or log processing server(s) 116 may generate the log identifier 126. The log identifier 126 may include alphanumeric data, such as a string, or another type of data, that may be used to differentiate the first log data 118(1) from other log data 118. In some implementations, the log identifier 126 may match all or a portion of a request identifier associated with the request 104. For example, if the stored response data 112(1) includes a webpage indicated in the request 108 (e.g., page-level caching), the request identifier may serve as a unique identifier that may be associated with the first log data 118(1). However, if the stored response data 112(1) is associated with a component of a user interface (e.g., component-level caching), multiple components may be associated with the request identifier. In such a case, the log identifier 126 associated with the first log data 118(1) may differ from the request identifier. The log identifier 126 may differ from a session identifier associated with the request 108(1) and may be separate and independent from the session with which the request 108(1) is associated. For example, the log identifier 126 may be used to access the stored log data 118(1) at a future time independent of the session with which a subsequent request 108 is associated or the length of time that has passed since receipt of the initial request 108(1).

At a subsequent time, if a response 104 is generated that includes the response data 112(1) from the web caching server(s) 114, the stored log data 118(1) from the log caching server(s) 124 may be provided to the clickstream server(s) 120 or to the log processing server(s) 116. The stored log data 118(1) may be combined with other log data 118 to form a clickstream log 102 representative of the stored response data 112(1) as well as other data that was included in a response 104.

Figure 1B:
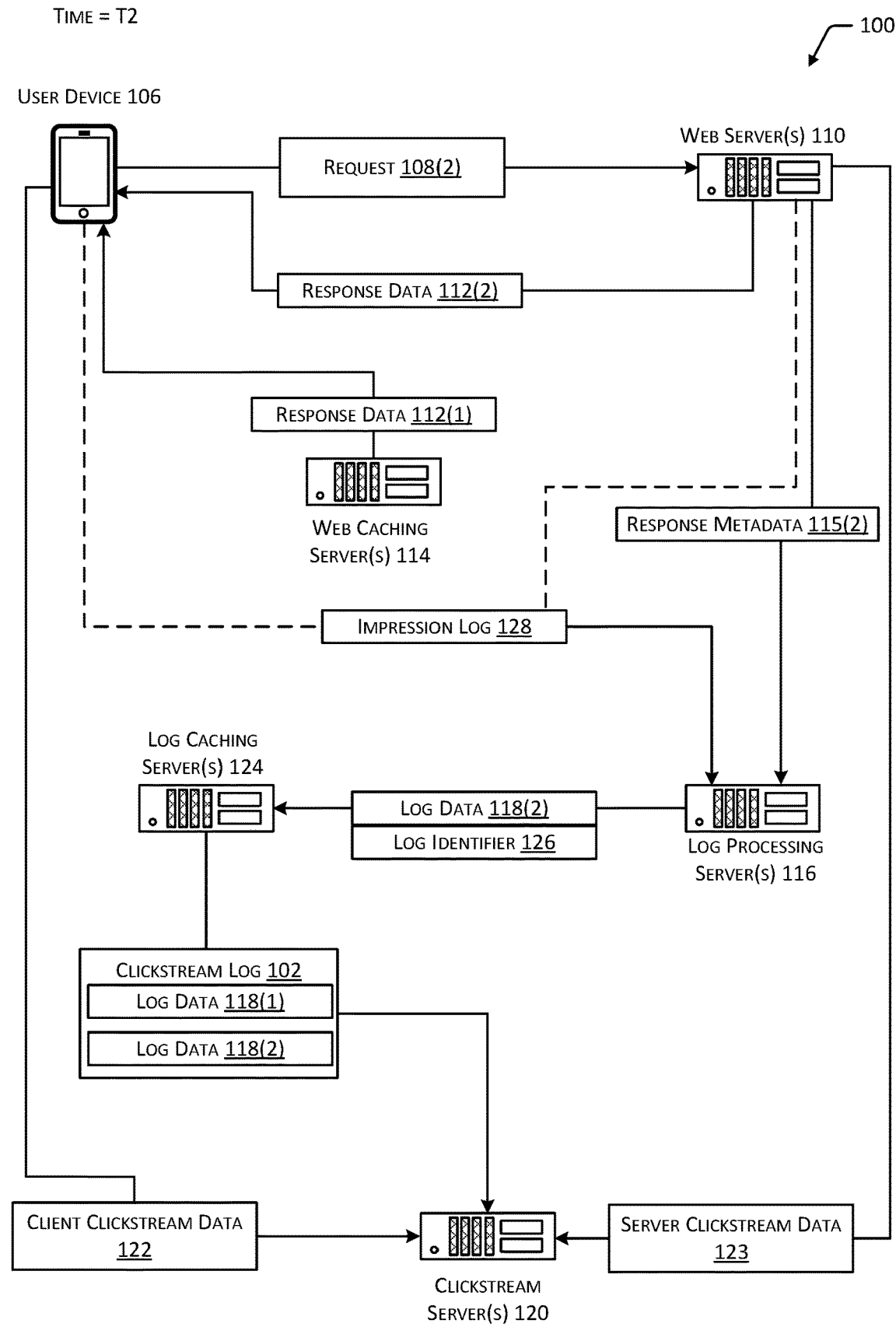
FIG. 1B depicts the system of FIG. 1A at a second time, subsequent to the first time, when previously-stored data is used to generate a response and log data associated with the stored data is used to generate a clickstream log.

FIG. 1B depicts the system 100 of FIG. 1A at a second time T2, subsequent to the first time T1, when previously-stored data is used to generate a response 104 and log data 118 associated with the stored data is used to generate a clickstream log 102. At the second time T2, the user device 106 may provide a request 108(2) to the web server(s) 110. The request 108(2) may indicate the same webpage, user interface, or other content described with regard to FIG. 1A, or different content. The request 108(2) at the second time T2 may be associated with a different session than the request 108(1) that was previously provided at the first time T1, shown in FIG. 1A. As such, the second request 108(2) may be associated with a different session identifier than the first request 108(1), and in some cases may be received a significant length of time after receipt of the first request 108(1). Based on the requested content and the information regarding the user device 106, service, or user account presented in the request 108(2), the web server(s) 110, the web caching server(s) 114, or in some implementations, the user device 106 may determine that at least a portion of the data that may be used to generate a response 104 has been previously-stored. In some cases, other data that may be used to generate the response 104 may be provided by the web server(s) 110. In some implementations, a server associated with a CDN may receive the request 108(2) and determine a portion of the associated response data 112 is stored in a cache. The server associated with the CDN may then cause the web caching server(s) 114 to provide the stored response data 112(1) to the user device 106 and in some cases may cause the web server(s) 110 to generate additional response data 112(2). For example, FIG. 1B depicts the user device 106 receiving first response data 112(1) from the web caching server(s) 114 and second response data 112(2) from the web server(s) 110. While FIGS. 1A and 1B both depict the web server(s) 110 providing second response data 112(2) to the user device 106, in other implementations, other response data 112 may be provided. For example, at the first time T1, the user device 106 may provide a request 108(1) to access a first webpage, the first response data 112(1) may include an image or other content presented on the first webpage, and the second response data 112(2) may include additional content. At the second time T2, the user device 106 may provide a request 108(2) to access a different webpage that includes the same image. The first response data 112(1) may therefore be retrieved from a cache and provided to the user device 106, while the web server(s) 110 may provide other response data 112 associated with the different webpage to the user device 106.

The web server(s) 110 may provide response metadata 115(2) indicative of the second response data 112(2) that was provided to the user device 106 to the log processing server(s) 116. In other implementations, the user device 106 may provide data indicative of the second response data 112(2) to the log processing server(s) 116, or the web server(s) 110 may generate log data 118(2) based on the second response data 112(2). In response to the previously-stored response data 112(1) being provided to the user device 106, the log processing server(s) 116 may associate the log identifier 126 for the first log data 118(1) with the second log data 118(2) and provide the second log data 118(2) and the log identifier 126 to the log caching server(s) 124. In some implementations, one or more of the web server(s) 110, the web caching server(s) 114, or the user device 106 may provide to the log processing server(s) 116 an indication that the stored response data 112(1) was used. In other implementations, the web server(s) 110, web caching server(s) 114, or user device 106 may provide data indicative of the log identifier 126 or second log data 118(2) to the log caching server(s) 124. For example, in response to generation of a request 108(2) associated with cached response data 112(1) or receipt of cached response data 112(1), a browser application or other component of the user device 106 may provide an impression log 128, which may include data indicative of the log identifier 126, first request 108(1), first response metadata 115(1), second response metadata 115(2), or second log data 118(2), to the log processing server(s) 116 or the log caching server(s) 124. In other cases, the web server(s) 110 may provide the impression log 128 to the log processing server(s) 116.

In response to receipt of the log identifier 126, the log caching server(s) 124 may determine the first log data 118(1) stored in association with the log identifier 126. The log caching server(s) 124 may then generate a clickstream log 102 based on the previously-stored first log data 118(1) and the second log data 118(2) received from the log processing server(s) 116. The clickstream log 102 may be provided to the clickstream server(s) 120, which may in turn provide the clickstream log 102, client clickstream data 122, and server clickstream data 123 to data storage, computing devices associated with data consumers, and so forth. In other implementations, the log caching server(s) 124 may determine the first log data 118(1) associated with the log identifier 126 and provide the first log data 118(1) to the log processing server(s) 116, which may generate the clickstream log 102 based on the first log data 118(1) and second log data 118(2). In still other implementations, the clickstream server(s) 120 may receive the first log data 118(1) and second log data 118(2) and generate the clickstream log 102 based on the log data 118.

Figure 2:
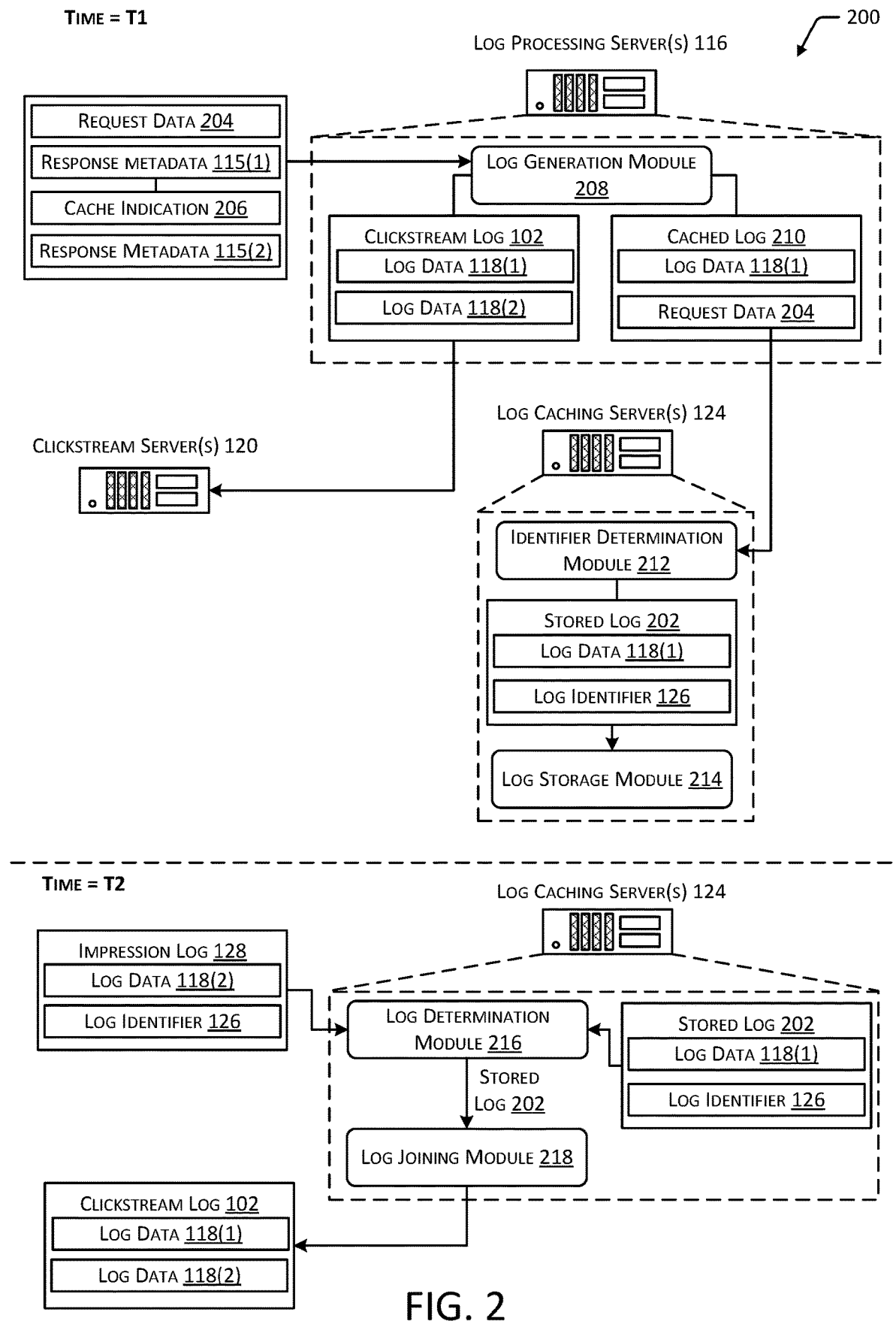
FIG. 2 is a block diagram depicting example systems for storing logs associated with cached response data and accessing stored logs for use generating clickstream logs.

FIG. 2 is a block diagram 200 depicting example systems for storing logs associated with cached response data 112 and accessing stored logs 202 for use generating clickstream logs 102. At a first time T1, generation of a stored log 202 is shown, while at a second time T2 subsequent to the first time T1, use of a stored log 202 to generate a clickstream log 102 is shown. As described with regard to FIGS. 1A and 1B, one or more log processing servers 116 may receive data indicative of a response 104 that was provided to a requesting device. For example, a response 104 may include first response data 112(1) and second response data 112(2) indicative of the webpage or other type of content to which access is requested. The data indicative of the response 104 may include first response metadata 115(1) that indicates the first response data 112(1) and second response metadata 115(2) that indicates the second response data 112(2). The data received by the log processing server(s) 116 may also include request data 204 indicative of one or more characteristics of the request 108 that was received, the computing device or service providing the request 108, a user account associated with the request 108, and so forth. Continuing the example, the request data 204 may include a request identifier associated with the request 108, an identifier of the webpage or other content to which access is requested, or an indication of one or more characteristics of the computing device providing the request 108. In some implementations, the data received by the log processing server(s) 116 may also include a cache indication 206 indicative of response data 112(1) that was cached or otherwise stored for future use. For example, as described with regard to FIGS. 1A and 1B, a portion of the response 104, such as the first response data 112(1) may be stored in a cache, while second response data 112(2) is not stored in the cache. The cache indication 206 may indicate particular response data 112 that was stored, particular response data 112 that was not stored, or both response data 112 that was stored and not stored. For example, FIG. 2 depicts the cache indication 206 associated with the first response metadata 115(1), which may indicate that the first response data 112(1) was stored.

A log generation module 208 associated with the log processing server(s) 116 may determine log data 118 based on the response metadata 115 that is received. In some implementations, the log data 118 may include at least a portion of the response metadata 115. In other implementations, the response metadata 115 may be modified, processed, converted to an alternate format, and so forth to form the log data 118. In still other implementations, the log data 118 may include an indication of the response metadata 115 that was received but may not necessarily include a portion of the response metadata 115. The log generation module 208 may generate a clickstream log 102 based on the first response metadata 115(1) and second response metadata 115(2) to be provided to one or more clickstream servers 120. For example, the clickstream log 102 may include first log data 118(1) representative of the first response data 112(1) and second log data 118(2) representative of the second response data 112(2). Additionally, in response to the cache indication 206 indicating that the first response data 112(1) was stored in a cache or other type of data storage, the log generation module 208 may generate a cached log 210 that includes log data 118(1) representative of the first response data 112(1) that was stored. In some implementations, the cached log 210 may also include at least a portion of the request data 204, such as a request identifier associated with the request 108 to which the response 104 was provided.

One or more log caching servers 124 may receive the cached log 210 from the log processing server(S) 116. As described with regard to FIGS. 1A and 1B, in other implementations, the functions described with regard to the log processing server(s) 116 and log caching server(s) 124 may be performed using a single computing device or set of computing devices. An identifier determination module 212 associated with the log caching server(s) 124 may determine a log identifier 126 to be associated with the cached log 210. As described with regard to FIGS. 1A and 1B, in other implementations, the log identifier 126 may be determined by the web server(s) 110. In some implementations, the log identifier 126 may be determined based in part on the request data 204. For example, in cases where the first log data 118(1) includes a cached webpage, the log identifier 126 may match the request identifier of the request 108. In cases where the first log data 118(1) includes a component of a user interface, the log identifier 126 may differ from the request identifier. The log identifier 126 may be associated with the first log data 118(1) to form a stored log 202. As described with regard to FIGS. 1A and 1B, the log identifier 126 may be independent of the session or session identifier associated with a received request 108 to enable the associated stored log 202 to be accessed in response to subsequent requests 108 independent of the session with which the subsequent requests 108 are associated. The stored log 202 may be provided to a log storage module 214 associated with the log caching server(s) 124. The log storage module 214 may store the stored log 202 in data storage. In some implementations, the stored log 202 may be stored with a first expiration time until a confirmation that the associated response data 112(1) was cached is received, at which point the stored log 202 may be associated with a greater expiration time or moved to other data storage associated with a greater expiration time. In other implementations, the stored log 202 may be stored with a greater expiration time in the absence of such a confirmation. For example, the response metadata 115(1) or log data 118(1) may include an indication that the response data 112(1) is to be stored, and the stored log 202 may be provided to data storage in response to this indication. In some implementations, the expiration time associated with the stored log 202 may be equal to or greater than an expiration time associated with the stored response data 112(1).

At the second time T2, a log determination module 216 associated with the log caching server(s) 124 may receive an impression log 128 indicating that the stored response data 112(1) was provided in a response 108. As described with regard to FIG. 1B, the impression log 128 may be provided from the user device 106 providing the request 108, the web server(s) 110 providing the response 104, the web caching server(s) 114 that provide the stored response data 112, or the log processing server(s) 116 that receive an indication of the response data 112 that was provided. The impression log 128 may include the log identifier 126 associated with the stored log 202. In some implementations, the impression log 128 may include log data 118(2) associated with other response data 112 that was also included in a response 104. The log determination module 216 may determine correspondence between the log identifier 126 indicated in the impression log 128 and the log identifier 126 for the stored log 202. This correspondence may indicate that the previously-stored response data 112(1) represented by the log data 118(1) was provided in a response 104. In response to this determination, a log joining module 218 associated with the log caching server(s) 124 may generate a clickstream log 102 based on the log data 118(1) from the stored log 202 and the log data 118(2) from the impression log 128. The clickstream log 102 may be provided to the clickstream server(s) 120.

Figure 3:
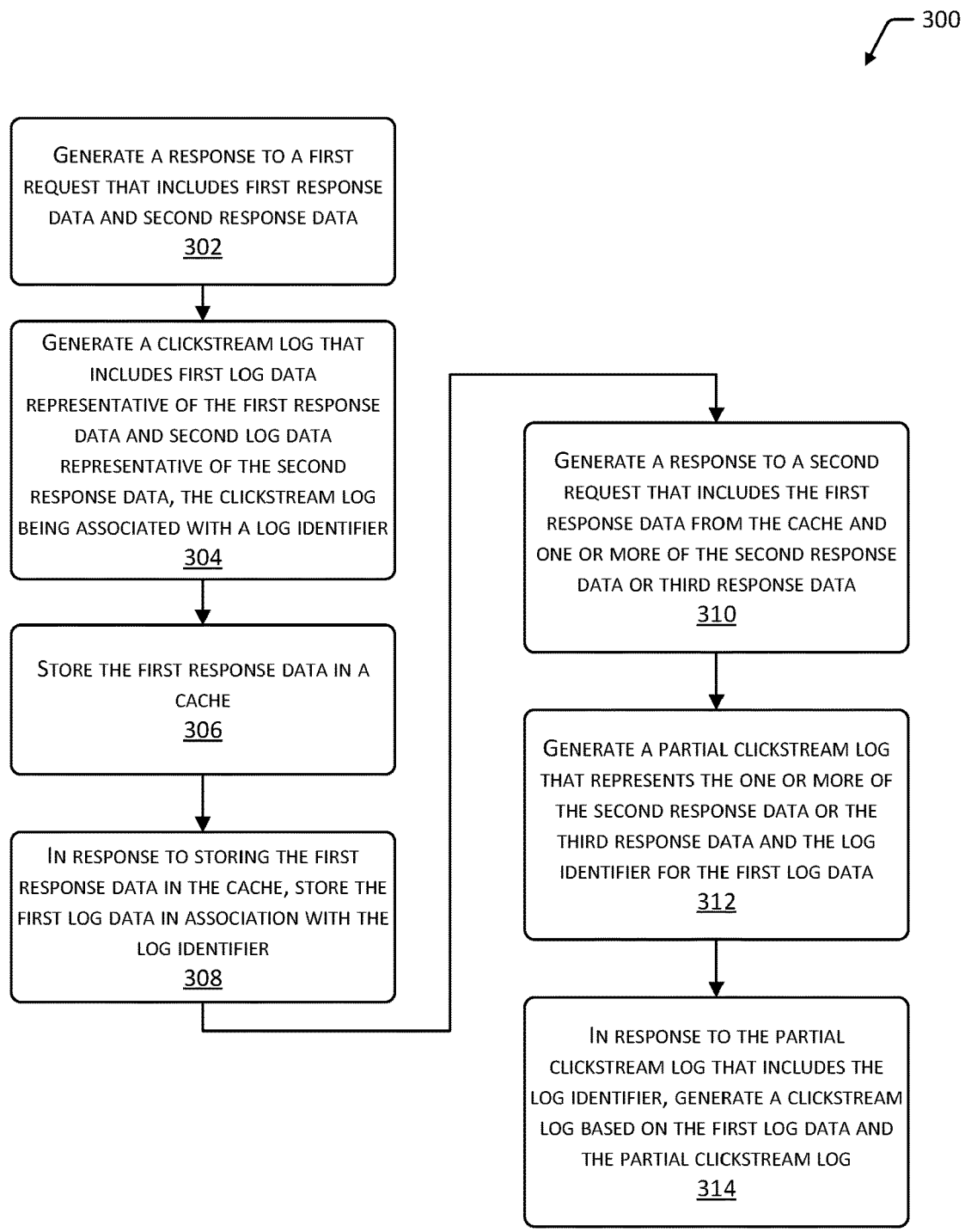
FIG. 3 is a flow diagram illustrating an implementation of a method for generating and storing log data indicative of stored response data, and using the stored log data to generate a clickstream log indicative of a subsequent response.

FIG. 3 is a flow diagram 300 illustrating an implementation of a method for generating and storing log data 118 indicative of stored response data 112, and using the stored log data 118 to generate a clickstream log 102 indicative of a subsequent response 104. At 302, a response 104 to a first request 108 may be generated that includes first response data 112(1) and second response data 112(2). As described with regard to FIGS. 1A-2, a response 104 may include different types of data. For example the first response data 112(1) may include a first webpage of a website while the second response data 112(2) includes a different webpage or particular components of the first webpage or other webpages. As another example, the first response data 112(1) may include an image, video, or other type of component of a webpage, while the second response data 112(2) may include one or more other components of the webpage. As yet another example, second response data 112(2) may include portions of a webpage that are personalized to a user account, such as elements that present an account name or content based on the browsing history, search history, purchase history associated with a user account, while first response data 112(1) includes portions of the webpage that present non-personalized content.

At 304, a clickstream log 102 may be generated that includes first log data 118(1) representative of the first response data 112(1) and second log data 118(2) representative of the second response data 112(2). The clickstream log 102 may be associated with a log identifier 126. Log data 118 may indicate interactions associated with particular response data 112, such as user clicks or other navigational selections, input provided to different features of a user interface, dwell time associated with a user interface, the position of a cursor, and so forth. Log data 118 may also indicate the specific response data 112 that was provided to a user device 106, such as particular webpage elements. In some implementations, the log identifier 126 that is associated with the clickstream log 102 may be based in part on request data 204, such as a request identifier associated with the request 108. In other implementations, the log identifier 126 may differ from the request identifier and from the identifiers associated with other log data 118. The log identifier 126 may be independent from a session identifier associated with the first request 108(1) to enable the associated clickstream log 102 to be accessed independent of the session with which a subsequent request 108 is associated.

At 306, the first response data 112(1) may be stored in a cache. In other implementations, the first response data 112(1) may be stored in other types of data storage. In some cases, the first response data 112(1) may be associated with an expiration time. For example, after the expiration time has lapsed, the first response data 112(1) may no longer be used to generate subsequent responses 104. Storage of the first response data 112(1) may enable responses 104 that include the first response data 112(1) to be generated more quickly and using fewer computational resources. For example, the first response data 112(1) may include a webpage, image, video, or so forth stored in association with a CDN or a cache associated with a browser application. Retrieving the first response data 112(1) from data storage associated with a CDN or browser application may be achieved more quickly and using fewer computational resources than generation of a response 104 that includes the response data 112(1) by one or more web servers 110.

At 308, in response to the storing of the first response data 112(1) in a cache, the first log data 118(1) may also be stored in association with the log identifier 126. As described with regard to FIG. 2, when particular response data 112(1) is stored, the particular log data 118(1) that corresponds to that response data 112(1) may also be stored. As a result, when the stored response data 112(1) is used to generate a response 104, the stored log data 118(1) may be used to generate an associated clickstream log 102. In the absence of the stored log data 118(1), a clickstream log 102 based on the data that was generated and provided in a response 104 may not necessarily indicate the previously-stored response data 112(1) that was also used.

At 310, a response 104 to a second request 108 may be generated. The response 104 may include the first response data 112(1) from the cache and one or more of the second response data 112(2) or third response data 112. For example, a request 108 to access the same webpage or other type of user interface may result in a response 104 that includes the first response data 112(1) from the cache and the second response data 112(2) that was provided at block 302. However, a request 108 to access a different webpage or user interface that also includes components represented by the first response data 112(1) may result in generation of a response 104 that includes the first response data 112(1) and other response data 112 that was not previously generated.

At 312, a partial clickstream log 102 may be generated that represents the second response data 112(2) or third response data 112 and the log identifier 126 for the first log data 118(1). For example, as described with regard to FIGS. 1B and 2, the partial clickstream log 102 may include an impression log 128 that may be provided by one or more of the user device 106, the web server(s) 110, or the log processing server(s) 116, to the log caching server(s) 124 that store the log data 118(1) in association with the log identifier 126.

At 314, in response to the partial clickstream log 102 that includes the log identifier 126, a clickstream log 102 may be generated based on the first log data 118(1) and the data included in the partial clickstream log 102. For example, if the partial clickstream log 102 includes second log data 118(2) or third log data 118 representative of third response data 112, the clickstream log 102 that is generated may include the first log data 118(1) representative of the first response data 112, and one or more of the second log data 118(2) or the third log data 118. As described with regard to FIG. 2, the clickstream log 102 may be generated by determining correspondence between a stored log 202 and the received log identifier 126, then joining the log data 118(1) from the stored log 202 with the log data 118 from the partial clickstream log 102. The clickstream log 102 may then be provided to one or more clickstream servers 120 or to one or more consumers of clickstream data.

Figure 4:
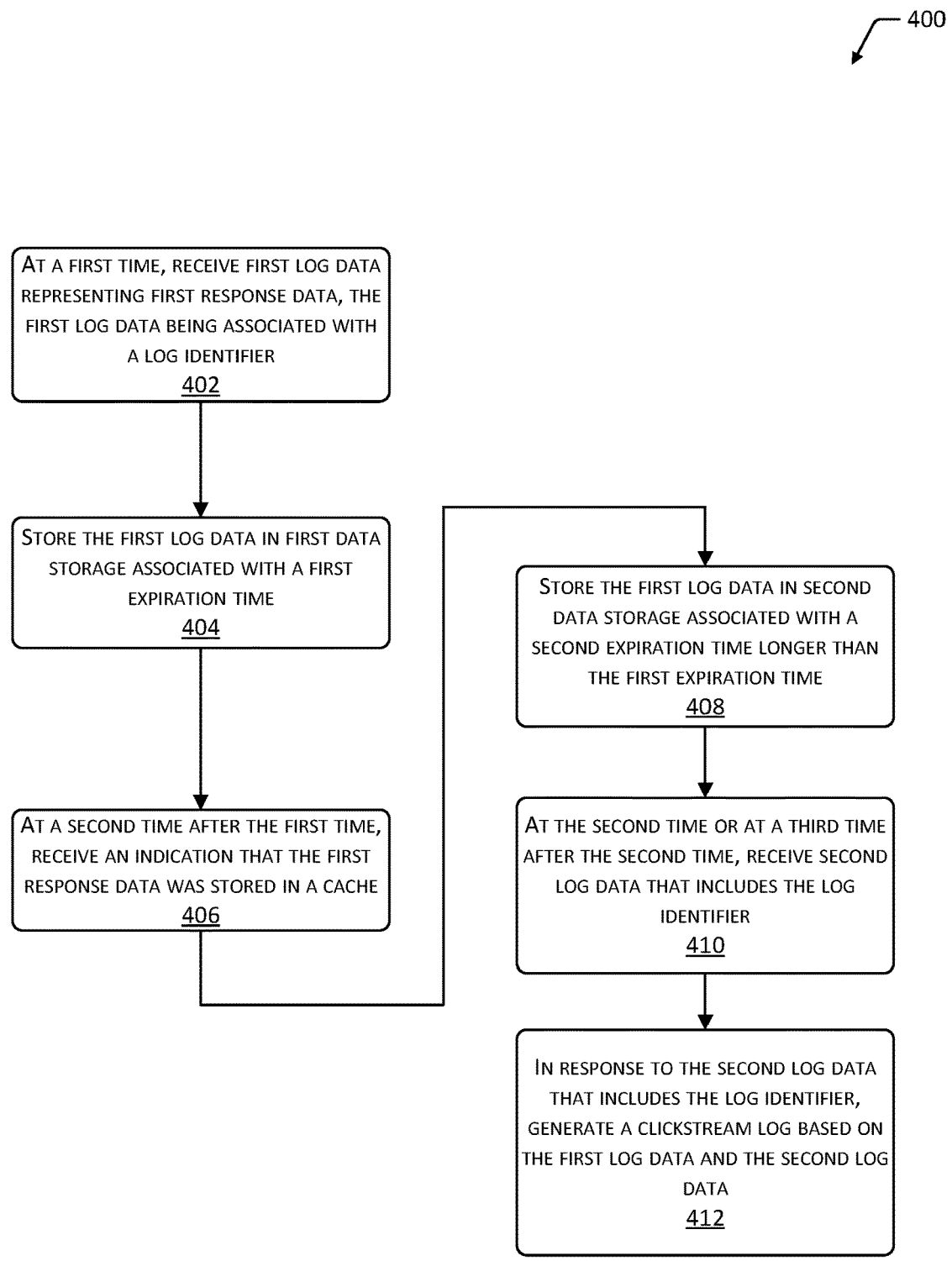
FIG. 4 is a flow diagram illustrating an implementation of a method for storing log data in association with expiration times based on the status of associated response data, and using the stored log data to generate a clickstream log.

FIG. 4 is a flow diagram 400 illustrating an implementation of a method for storing log data 118 in association with expiration times based on the status of associated response data 112, and using the stored log data 118 to generate a clickstream log 102. At 402, at a first time, first log data 118(1) that represents first response data 112(1) may be received. The first log data 118(1) may be associated with a log identifier 124. For example, a response 104 provided to a computing device may include first response data 112(1) and in some cases, additional response data 112(2). In such a case, first log data 118(1) may correspond to the first response data 112(1) while other log data 118(2) may correspond to the additional response data 112(2). In other cases, a response 104 may include only the first response data 112(1), and the first log data 118(1) may represent the entirety of the response data 112(1) included in the response 104.

At 404, the first log data 118(1) may be stored in first data storage associated with a first expiration time. In some implementations, the first log data 118(1) may be stored prior to storage of the first response data 112(1) in a cache or other type of data storage. For example, in some cases, the first log data 118(1) may be generated prior to transmission of the first response data 112(1) to a web caching server 114 or other data storage system, or prior to storage of the first response data 112(1) by such a system. In such a case, the future utility of the first log data 118(1) may be unknown until the first response data 112(1) is stored or until an impression log 128 indicating the first response data 112(1) or first log data 118(1) is received. As such, the first log data 118(1) may be stored, in association with a short expiration time, to determine whether the first response data 112(1) is stored.

At 406, at a second time after the first time, an indication that the first response data 112(1) was stored in a cache may be received. For example, a web caching server 114 or other computing device associated with data storage may generate an indication when the first response data 112(1) is stored and provide this indication to the log caching server(s) 124. In other implementations, receipt of an impression log 128 or other indication that the response data 112(1) was used to generate a response 104 may function as an indication that the first response data 112(1) was stored. For example, receipt of an impression log 128 that references the log identifier 126 for the first log data 118(1) may indicate that the response data 112(1) associated with the first log data 118(1) was included in a response 104.

At 408, the first log data 118(1) may be stored in second data storage associated with a second expiration time longer than the first expiration time. For example, in response to an indication that the associated response data 112(1) was stored, the first log data 118(1) may be stored for a longer period of time. In other implementations, rather than storing the first log data 118(1) in different data storage, the first log data 118(1) may be maintained in the same data storage but associated with a different expiration time. In some implementations, the expiration time for the second data storage may be equal to the expiration time for storage of the response data 112(1). In other implementations, the expiration time associated with the log data 118(1) may be greater than the expiration time associated with the response data 112(1).

At 410, at the second time, or at a third time after the second time, second log data 118(2) that includes the log identifier 126 may be received. For example, an impression log 128 indicative of the log identifier 126 may be received, indicating that the previously-stored response data 112(1) was used to generate a response 104. In some cases, the second log data 118(2) may represent additional response data 112(2) that was also used to generate the response 104. In other cases, the second log data 118(2) may be empty or may be omitted. For example, in such a case, the previously-stored response data 112(1) may constitute the entirety of a subsequent response 104.

At 412, in response to the second log data 118(2) that includes the log identifier 126, a clickstream log 102 may be generated based on the first log data 118(1) and the second log data 118(2). For example, based on the received log identifier 126, the stored first log data 118(1) that is associated with the log identifier 126 may be determined. The clickstream log 102 may include at least a portion of the first log data 118(1). In cases where additional response data 112(2) was used to generate a response 104, the clickstream log 102 may also include at least a portion of the second log data 118(2) representative of the additional response data 112(2).

Figure 5:
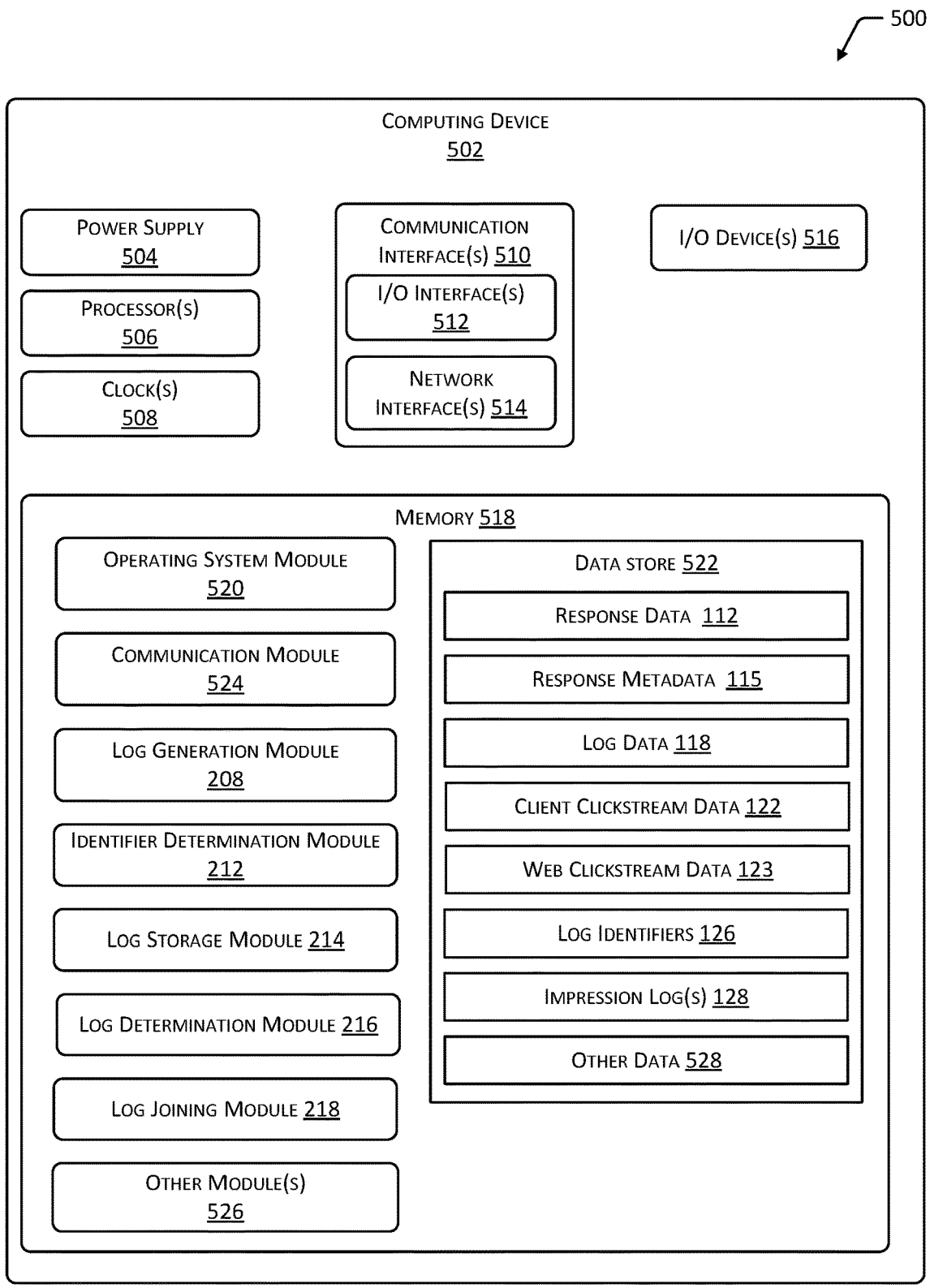
FIG. 5 is a block diagram illustrating an implementation of a computing device within the present disclosure.

FIG. 5 is a block diagram 500 illustrating an implementation of a computing device 502 within the present disclosure. The computing device 502 may include one or more servers, such as the web server(s) 110, web caching server(s) 114, log processing sever(s) 116, clickstream server(s) 120, or log caching server(s) 124 shown in FIGS. 1A-2. The computing device 502 may also include one or more user devices 106. As such, while FIG. 5 depicts a single block diagram 500 of a computing device 502, any number and any type of computing devices 502 may be used to perform the functions described herein. For example, the division of computational tasks between web server(s) 110, web caching server(s) 114, log processing sever(s) 116, clickstream server(s) 120, and log caching server(s) 124 shown in FIGS. 1A and 1B is only one possible implementation. A single computing device 502 or group of computing devices 502 could perform each of the functions described herein, or different computing devices 502 or groups of computing devices 502 could perform different subsets of the functions described herein.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clock(s) 508 may provide information indicative of date, time, ticks, and so forth. For example, the processor(s) 506 may use data from the clock 508 to generate a timestamp, trigger a preprogrammed action, and so forth.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the computing device 502. For example, I/O devices 516 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 516 may be physically incorporated with the computing device 502. In other implementations, I/O devices 516 may be externally placed.

The network interfaces 514 may be configured to provide communications between the computing device 502 and other devices, such as the I/O devices 516, routers, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 3G, 4G, 5G, LTE, and so forth.

The computing device 502 may include one or more busses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC).

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 522 and one or more of the following modules may also be associated with the memory 518. The modules may be executed as foreground applications, background tasks, daemons, and so forth. The data store(s) 522 may use a flat file, database, linked list, tree, executable code, script, or other data structure to store information. In some implementations, the data store(s) 522 or a portion of the data store(s) 522 may be distributed across one or more other devices including other computing devices 502, network attached storage devices, and so forth.

A communication module 524 may be configured to establish communications with one or more other computing devices 502. Communications may be authenticated, encrypted, and so forth.

The memory 518 may also store the log generation module 208. The log generation module 208 may determine the particular response data 112 that was used to generate a response 104 and may generate log data 118 indicative of the response data 112. Response metadata 115, which may include an indication of the response data 112 that was provided in a response 104, may be received from a web server 110 or other computing device 502 that generates and provides a response 104 to a user device 106, from the user device 106 receiving the response 104, or from another computing device 502 in communication with the computing device 502 that sends or receives the response 104. The log data 118 may represent the response data 112 that was provided to the requesting computing device 502 and in some cases, may also represent interactions or input received with regard to particular content presented in the response 104. The log generation module 208 may generate clickstream logs 102 to be provided to clickstream servers 120 or to consumers of clickstream data. The log generation module 208 may also generate cached logs 210 that include log data 118 representing response data 112 that was stored in a cache or other data storage for future use generating responses 104.

The memory 518 may additionally store the identifier determination module 212. The identifier determination module 212 may generate a log identifier 126 for a cached log 210. In some implementations, the log identifier 126 may be generated based in part on request data 204 associated with the cached log 210, such as a request identifier associated with the request 108 to which the response 104 was provided. For example, if the cached log 210 is associated with a webpage (e.g., page-level data), the log identifier 126 may match the request identifier. However, if the cached log 210 is associated with particular components of a user interface (e.g., component-level data), the log identifier 126 may differ from the request identifier. In some implementations, the identifier determination module 212 may also associate log identifiers 126 with clickstream logs 102, impression logs 128, or other sources of log data 118.

The memory 518 may store the log storage module 214. The log storage module 214 may store log data 118 in data storage and access stored logs 202 in response to data associated with the log identifier 126 of a stored log 202. For example, as described with regard to FIG. 4, a stored log 202 may be stored in first data storage associated with a first expiration time until an indication that response data 112 associated with the stored log 202 has been cached or otherwise placed in data storage. In response to the indication that the response data 112 has been stored, the stored log 202 may be associated with a greater expiration time, which in some implementations may be equal to or greater than an expiration time associated with the stored response data 112.

The memory 518 may also store the log determination module 216. The log determination module 216 may receive impression logs 128 or other data that indicates a log identifier 126. In response to the log identifier 126, the log determination module 216 may determine the stored log 202 that corresponds to the received log identifier 126 and provide the stored log 202 and the received impression log 128 or other communication to the log joining module 218.

The memory 518 may additionally store the log joining module 218, which may generate a clickstream log 102 based in part on a stored log 202. In some implementations, the clickstream log 102 may include all of the log data 118 associated with the stored log 202. In other implementations, the clickstream log 102 may include a portion of the log data 118 associated with the stored log 202. In cases where an impression log 128 or other source of log data 118 includes additional log data 118 that is not included in the stored log 202, the log joining module 218 may also include at least a portion of the additional log data 118 in the clickstream log 102.

Other modules 526 may also be present in the memory 518. For example, other modules 526 may include modules for receiving and processing requests 108 and generating responses 104, identifying characteristics of user devices 106, determining data associated with user devices 106 or user accounts, and so forth. Other modules 526 may also include encryption modules to encrypt and decrypt communications between computing devices 502, authentication modules to authenticate communications sent or received by computing devices 502, a permission module to assign, determine, and manage user permissions to access or modify data associated with computing devices 502, such as expiration times associated with storage of log data 118, and so forth.

Other data 528 within the data store(s) 522 may include configurations, settings, preferences, and default values associated with computing devices 502. Other data 528 may also include encryption keys and schema, access credentials, and so forth. Other data 528 may also include network data indicative of networks and other computing devices 502 accessible to one or more computing devices 502. Other data 528 may include expiration times associated with storage of response data 112 or log data 118.

In different implementations, different computing devices 502 may have different capabilities or capacities. For example, servers may have greater processing capabilities or data storage capacity than user devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
receive a first request;
generate a first response based on the first request, wherein the first response includes first data and second data;
determine a first clickstream log indicative of the first data and the second data;
store the first data in a cache;
in response to storing the first data in the cache, determine a second clickstream log indicative of the first data and associate a log identifier with the second clickstream log;
receive a second request;
generate a second response based on the second request by:
generating the second data; and
accessing the first data stored in the cache;
determine a third clickstream log indicative of the second data, wherein the third clickstream log indicates the log identifier; and
in response to the third clickstream log indicating the log identifier:
determine that the second clickstream log is associated with the log identifier; and
determine a fourth clickstream log by combining the second clickstream log representative of the first data stored in the cache and the third clickstream log representative of the second data of the second response.

2. The system of claim 1, wherein the first data stored in the cache includes a webpage of a website, the system further comprising computer-executable instructions to:
determine a request identifier associated with the first request; and
generate the log identifier to match the request identifier.

3. The system of claim 1, further comprising computer-executable instructions to:
store the second clickstream log;
at a first time, associate a first expiration time with the second clickstream log; and
at a second time subsequent to the first time, in response to determining that the first data was stored in the cache, associate a second expiration time with the second clickstream log, wherein the second expiration time is greater than the first expiration time.

4. A method comprising:
receiving, at a first time, a first request associated with a first session identifier;
determining storage of first response data associated with the first request;
determining first log data indicative of the first response data;
in response to the storage of the first response data, associating the first log data with a
receiving, at a second time subsequent to the first time, a second request associated with a second session identifier that differs from the first session identifier;
receiving second log data, wherein the second log data is indicative of:
second response data associated with the second request; and
the first log identifier; and
in response to receiving the second log data that is indicative of the first log identifier, determining that the first log data is associated with the first log identifier and generating third log data based on the first log data and the second log data.

5. The method of claim 4, further comprising:
determining a request identifier associated with the first request, wherein the first response data is associated with a webpage; and
generating the first log identifier to include at least a portion of the request identifier and to differ from the first session identifier.

6. The method of claim 4, further comprising:
determining a request identifier associated with the first request, wherein the first response data is associated with a component included in a webpage; and
generating the first log identifier such that the first log identifier differs from the request identifier and the first session identifier.

7. The method of claim 4, further comprising:
storing the first log data with a first expiration time, wherein the determining the storage of the first response data occurs subsequent to the storing of the first log data; and
in response to the storage of the first response data, associating the first log data with a second expiration time greater than the first expiration time.

8. The method of claim 4, wherein the second request is received subsequent to the determining the storage of the first response data, the method further comprising:
determining that a response associated with the second request includes the second response data and the first response data;
generating the second log data based on the second response data; and
including the first log identifier in the second log data in response to the first response data being included in the response.

9. The method of claim 4, further comprising:
receiving the first log data; and
determining, based on the first log data, an indication that the first response data is to be stored;
wherein the first log data is stored in response to the indication.

10. The method of claim 4, further comprising:
determining a first expiration time associated with expiration of the first response data; and
determining a second expiration time to associate with the first log data, wherein the second expiration time is equal to or greater than the first expiration time.

11. The method of claim 4, wherein the second log data further indicates a second log identifier indicative of third response data accessed from storage and used to generate a response associated with the second response data, the method further comprising:
determining fourth log data stored in association with the second log identifier; and
generating the third log data further based on the fourth log data.

12. The method of claim 4, wherein the second log data is received prior to storage of the first response data, the method further comprising:
determining a failure to access the first log data in response to the first log identifier in the second log data; and
generating a queue that includes an indication of the second log data, wherein the indication is associated with one or more of a count of retries or an expiration time.

13. A system comprising:
one or more memories storing computer-executable instructions; and
one or more hardware processors to execute the computer-executable instructions to:
at a first time, receive first log data representative of interactions associated with first response data stored in a cache, wherein the first response data is provided in response to a first request associated with a first session identifier;
in response to storage of the first response data in the cache, associate a first log identifier with the first log data;
at one or more of the first time or a second time subsequent to the first time, receive second log data, wherein the second log data is representative of interactions in response to which the first response data from the cache was used to generate a response to a second request, and wherein the second request is associated with a second session identifier that differs from the first session identifier;
determine that the second log data indicates the first log identifier; and
in response to the first log identifier, generate third log data based on the first log data and the second log data.

14. The system of claim 13, wherein the first response data includes a webpage, the system further comprising computer-executable instructions to:
determine a request identifier associated with the first response data; and
generate the first log identifier to include at least a portion of the request identifier.

15. The system of claim 13, further comprising computer-executable instructions to:
determine a first expiration time associated with the first response data in the cache;

determine a second expiration time equal to or greater than the first expiration time; and associate the second expiration time with the first log data.

16. The system of claim 13, further comprising computer-executable instructions to:

at a third time subsequent to the first time, store the first log data in first data storage associated with a first expiration time;

at a fourth time subsequent to the third time, determine that the first log data is stored in the cache; and store the first log data in second data storage associated with a second expiration time greater than the first expiration time.

17. The system of claim 13, further comprising computer-executable instructions to:

at a third time subsequent to the first time, associate the first log data with a first expiration time; and in response to the second log data that indicates the first log identifier, associate the first log data with a second expiration time greater than the first expiration time.

18. The system of claim 13, further comprising computer-executable instructions to:

determine, based on the first log data, an indication that the first response data is to be stored in the cache; and storing the first log data in data storage in response to the indication.

19. The system of claim 13, further comprising computer-executable instructions to:

determine that a response generated responsive to the second request includes second response data generated subsequent to the first time, and further includes the first response data from the cache, wherein the second log data further indicates the second response data; and in response to the second response data including the first response data from the cache, include the first log identifier in the second log data.

20. The system of claim 13, further comprising computer-executable instructions to:

determine, at a third time subsequent to the first time, a failure to access the first log data;

generate a queue that includes an indication of the second log data in association with one or more of a count of retries or an expiration time;

determine, at a fourth time subsequent to the third time, access to the first log data; and remove the indication from the queue.

* * * * *

UNITED STATES PATENT AND TRADEMARK OFFICE
CERTIFICATE OF CORRECTION

| | |
|---|---|
| PATENT NO. | : 11,409,831 B1 |
| APPLICATION NO. | : 16/587840 |
| DATED | : August 9, 2022 |
| INVENTOR(S) | : Forrest Mackenzie Vines et al. |

It is certified that error appears in the above-identified patent and that said Letters Patent is hereby corrected as shown below:

In the Claims

Column 19, Claim 4, Line 20:
Currently reads "associating the first log data with a;"
When it should read --associating the first log data with a first log identifier;--.

Signed and Sealed this
Twentieth Day of September, 2022

*Katherine Kelly Vidal*

Katherine Kelly Vidal
*Director of the United States Patent and Trademark Office*